(12) United States Patent
Thakore et al.

(10) Patent No.: US 11,853,795 B1
(45) Date of Patent: Dec. 26, 2023

(54) SCOREBOARD FOR TRACKING COMPLETION OF TASKS

(71) Applicant: Beijing Tenafe Electronic Technology Co., Ltd., Beijing (CN)

(72) Inventors: Priyanka Nilay Thakore, Mountain View, CA (US); Chen Xiu, Beijing (CN); Lyle E. Adams, San Jose, CA (US); Deqiang Yang, Beijing (CN)

(73) Assignee: Beijing Tenafe Electronic Technology Co., Ltd.

( * ) Notice: Subject to any disclaimer, the term of this patent is extended or adjusted under 35 U.S.C. 154(b) by 0 days.

(21) Appl. No.: 18/124,199

(22) Filed: Mar. 21, 2023

Related U.S. Application Data

(60) Provisional application No. 63/392,321, filed on Jul. 26, 2022.

(51) Int. Cl.
*G06F 9/48* (2006.01)

(52) U.S. Cl.
CPC .................................. *G06F 9/4881* (2013.01)

(58) Field of Classification Search
CPC ..................................................... G06F 9/4881
See application file for complete search history.

(56) References Cited

U.S. PATENT DOCUMENTS

| 2011/0023077 | A1* | 1/2011 | Simon | H04N 21/4438 |
| | | | | 725/134 |
| 2016/0350236 | A1* | 12/2016 | Tsirkin | G06F 12/1081 |

* cited by examiner

*Primary Examiner* — Wissam Rashid
(74) *Attorney, Agent, or Firm* — Van Pelt, Yi & James LLP

(57) ABSTRACT

A hardware functional module in a System On Chip (SOC) performs a given task, where the given task is one of a plurality of tasks that are associated with a work item and the work item is managed by firmware in the SOC. A first notification that the given task has completed is sent from the hardware functional module to a scoreboard module, where the scoreboard module is implemented in hardware on the SOC. The scoreboard module: in response to receiving the first notification, increments a counter; determines whether the counter exceeds a threshold; and in the event it is determined that the counter exceeds the threshold, sends, from the scoreboard module to the firmware, a second notification indicating that the plurality of tasks have completed.

18 Claims, 9 Drawing Sheets

SCOREBOARD FOR TRACKING COMPLETION OF TASKS

CROSS REFERENCE TO OTHER APPLICATIONS

This application claims priority to U.S. Provisional Patent Application No. 63/392,321 entitled SCOREBOARD FOR TRACKING COMPLETION OF TASKS filed Jul. 26, 2022 which is incorporated herein by reference for all purposes.

BACKGROUND OF THE INVENTION

A System On Chip (SOC) often contains a combination of hardware functional modules (i.e., functional modules that are implemented in hardware on the SOC) and one or more processor cores on which firmware runs. In one example application, the SOC is used to implement a storage controller (e.g., a NAND Flash storage controller) which is used by a host to access (e.g., NAND Flash) storage. New techniques implemented on an SOC that permit smaller, less expensive, and/or less powerful processor cores to be used while still offering the same performance would be desirable.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of a (e.g., hardware-implemented) scoreboard module in a System On Chip (SOC) that is used to track the completion of a plurality of tasks and notify firmware (e.g., running on a processor core in the SOC) when those tasks have completed are described herein. For example, the plurality of tasks may be part of and/or need to be completed in order for the work item to be completed and firmware may be managing and/or supervising the work item. Conceptually, the scoreboard module detects when all of the tasks have completed and notifies firmware, offloading this monitoring and/or tracking of the completion of the tasks from firmware to the (e.g., hardware-implemented) scoreboard module.

Figure 1:
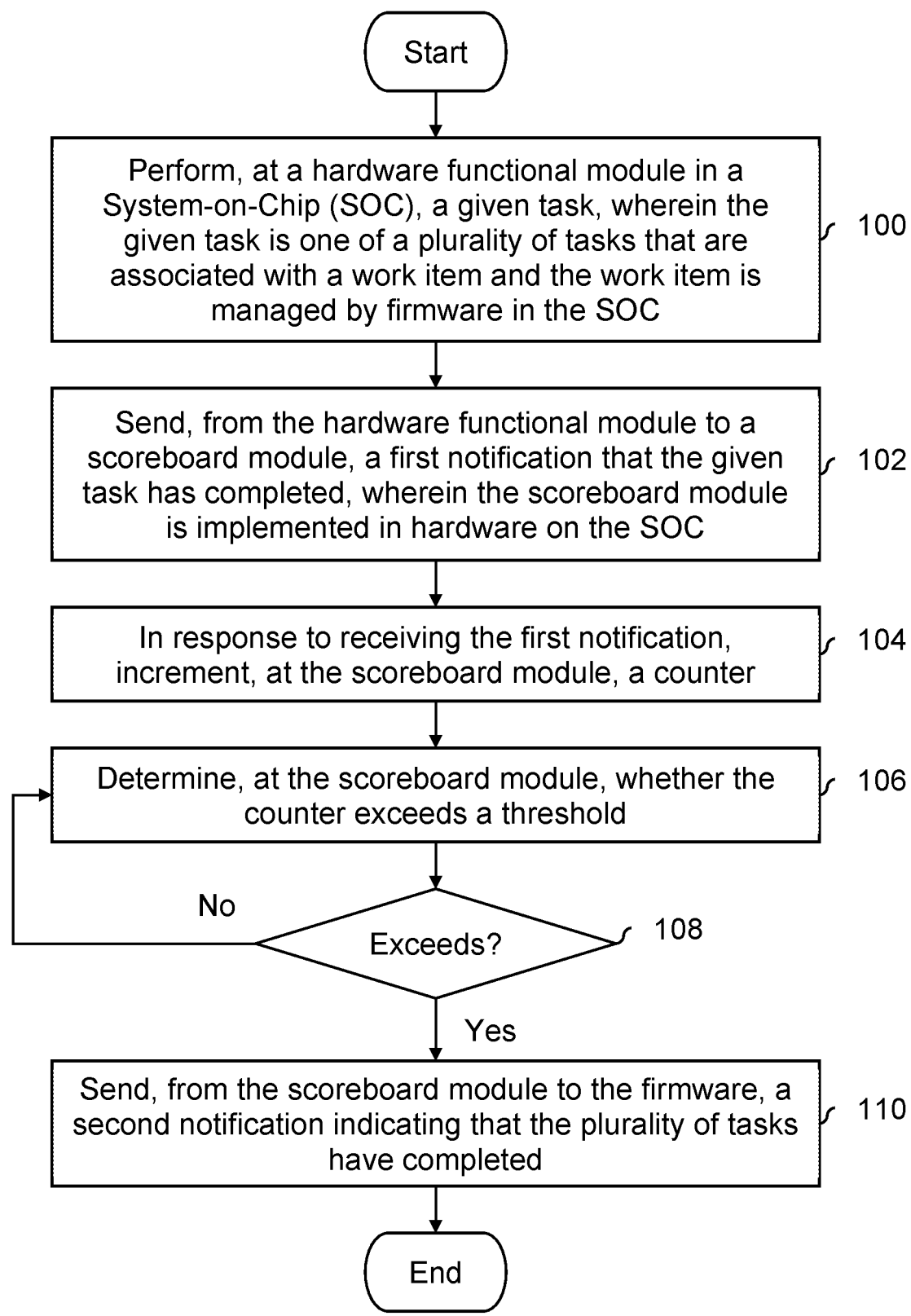
FIG. 1 is a flowchart illustrating an embodiment of a process to indicate to firmware in a System On Chip (SOC) that a plurality of tasks have completed.

FIG. 1 is a flowchart illustrating an embodiment of a process to indicate to firmware in a System On Chip (SOC) that a plurality of tasks have completed. In this example, some steps are performed by a hardware functional module in the SOC and other steps are performed by a scoreboard module in the SOC.

At 100, a given task is performed, at a hardware functional module in a System On Chip (SOC), wherein the given task is one of a plurality of tasks that are associated with a work item and the work item is managed by firmware in the SOC.

As used herein, "hardware functional module" refers to a functional module that is implemented in hardware (e.g., an application-specific integrated circuit (ASIC) or a field-programmable gate array (FPGA)) in an SOC. Hardware functional modules are able to run faster than firmware so in some applications, operations and/or functions are timing critical, and as such they are implemented in hardware.

In one example where the SOC is a storage controller (e.g., that sits between a host and NAND Flash storage), some example hardware functional modules include: a host interface that communicates with a host, an Advanced Encryption Standard (AES) encryption module that implements the encryption standard and functionality, a NAND Flash interface that communicates with the NAND Flash storage, and a low-density parity-check (LDPC) decoder that is used to error correction decode the LDPC encoded data that is stored on the NAND Flash storage.

As used herein, "work item" refers to an operation, function, or job that is managed or otherwise orchestrated by firmware (e.g., where the firmware runs on a processor core in the SOC). A work item includes or is otherwise associated with one or more component and/underlying tasks that are performed by one or more hardware functional modules in the SOC. In some cases, a work item also includes one or more tasks that are performed by firmware.

In one example where the SOC is a storage controller, the work item is a read operation of the NAND Flash storage, and the associated tasks include: translating a host address (i.e., logical address) to one or more physical addresses that is performed by a Flash Translation Layer (FTL) (e.g., that is implemented in and/or performed by firmware, and that stores a mapping between host addresses (i.e., logical addresses) and physical addresses (e.g., on NAND Flash storage, including a specific NAND Flash die, if applicable)), reading the NAND Flash storage to obtain encoded read data (which may contain errors) using the NAND Flash interface hardware functional module, and error correction decoding the encoded read data using an LDPC decoder hardware functional module.

In various embodiments, the plurality of tasks that comprise (or, more generally, are associated with) a work item has various (e.g., sequential) dependencies. For example, suppose a work item includes three tasks that are performed by various hardware functional modules. In one example, all three of the tasks can be performed independently so that the tasks can all be performed or otherwise completed in parallel. In another example, the first task must be completed before the second task can be initiated so that those two tasks must be performed serially. Relationships or dependencies (e.g., parallel vs. serial) between tasks can be handled or otherwise managed in a variety of ways. For example, one host can perform a read (e.g., 256 KB of data, total) comprising or across multiple NAND operations across multiple channels (e.g., 256 KB/64 KB=4 NAND operations). Or, (commands from) multiple hosts can be aggregated into an FTL lookup operation.

As will be described in more detail below, a task may, in turn, comprise multiple sub-tasks where the scoreboard module tracks completion of the (e.g., component) sub-tasks and notifies the appropriate entity (e.g., firmware) when all of the sub-tasks have completed.

At 102, a first notification that the given task has completed is sent, from the hardware functional module to a scoreboard module, wherein the scoreboard module is implemented in hardware on the SOC.

At 104, in response to receiving the first notification, a counter, at the scoreboard module, is incremented.

In some embodiments, a hardware functional module sends a scoreboard identifier (SBID) to the scoreboard module with the first notification. Each SBID is associated with specific aggregation task (i.e., each SBID is associated with a specific counter). For example, the scoreboard module may be tracking multiple work items and the scoreboard identifier is used by the scoreboard module to increment an appropriate counter (e.g., associated with the appropriate work item and/or specific aggregation task). The SBID is global (i.e., globally relevant and/or globally usable), permitting the SBID to be passed between and/or used by a variety of entities in the SOC (e.g., the firmware or other target, a hardware functional module performing a task, the scoreboard module, etc.). More detailed examples that include an SBID are described below.

At 106, it is determined, at the scoreboard module, whether the counter exceeds a threshold. For example, if a work item includes three tasks that are being tracked by the scoreboard module, the threshold may have been set to or initialized to three at the beginning of the process.

If the counter exceeds the threshold at 108, then at 110, a second notification indicating that the plurality of tasks have completed is sent from the scoreboard module to the firmware. Otherwise, if the counter does not exceed the threshold at 108, then it is determined (e.g., checked) again whether the counter exceeds the threshold. For example, as other tasks complete, the responsible hardware functional module will send a notification to the scoreboard module (see, e.g., 102), and the counter will be incremented further (see, e.g., 104).

As will be described in more detail below, the second notification sent to the firmware may comprise a variety of mechanisms through a variety of channels. For example, a more important and/or time-sensitive work item may use a more disruptive but faster indication technique whereas a less important and/or less time-sensitive work item may be exchanged in a slower but less disruptive manner.

Another advantage to the techniques described herein is the scalability and/or flexibility to change the combination and/or grouping of processors cores (i.e., firmware) and hardware functional modules because the scoreboard module acts as an interface between firmware and the hardware functional modules. For example, the scoreboard module permits the (relatively easy) redistribution of which (sub) tasks (e.g., performed by one or more hardware functional modules) are assigned to which processor cores (i.e., firmware). For example, depending on the application (e.g., frequent reading and writing where data is not stored for very long vs. infrequent reading and writing where data is stored for lengthy periods of time), certain hardware functional modules may be busier and/or have a larger load than others. Depending upon the application, the distribution or assignment of hardware functional modules to processor core (i.e., firmware) may be adjusted to better redistribute the load for that application (e.g., with no or minimal modification to the firmware and/or the hardware functional modules, due to the scoreboard module).

In another example, more processor cores (on which firmware runs) can be added to the system without having to modify the hardware functional modules to support the additional processor cores due to the scoreboard module (e.g., new scoreboard assignments for the new processor cores take care of the change). For example, a given hardware functional module would still communicate with the scoreboard module; the commands for the new processor cores (i.e., firmware) would be assigned to different scoreboard identifiers to properly track the correct processor core (i.e., firmware).

The following figures illustrate example components of an SOC which perform various steps recited in FIG. 1 (at least in some embodiments). These figures are used to (more clearly) illustrate various embodiments and/or aspects of the techniques described herein, including associated (e.g., technical) benefits and/or advantages.

Figure 2:
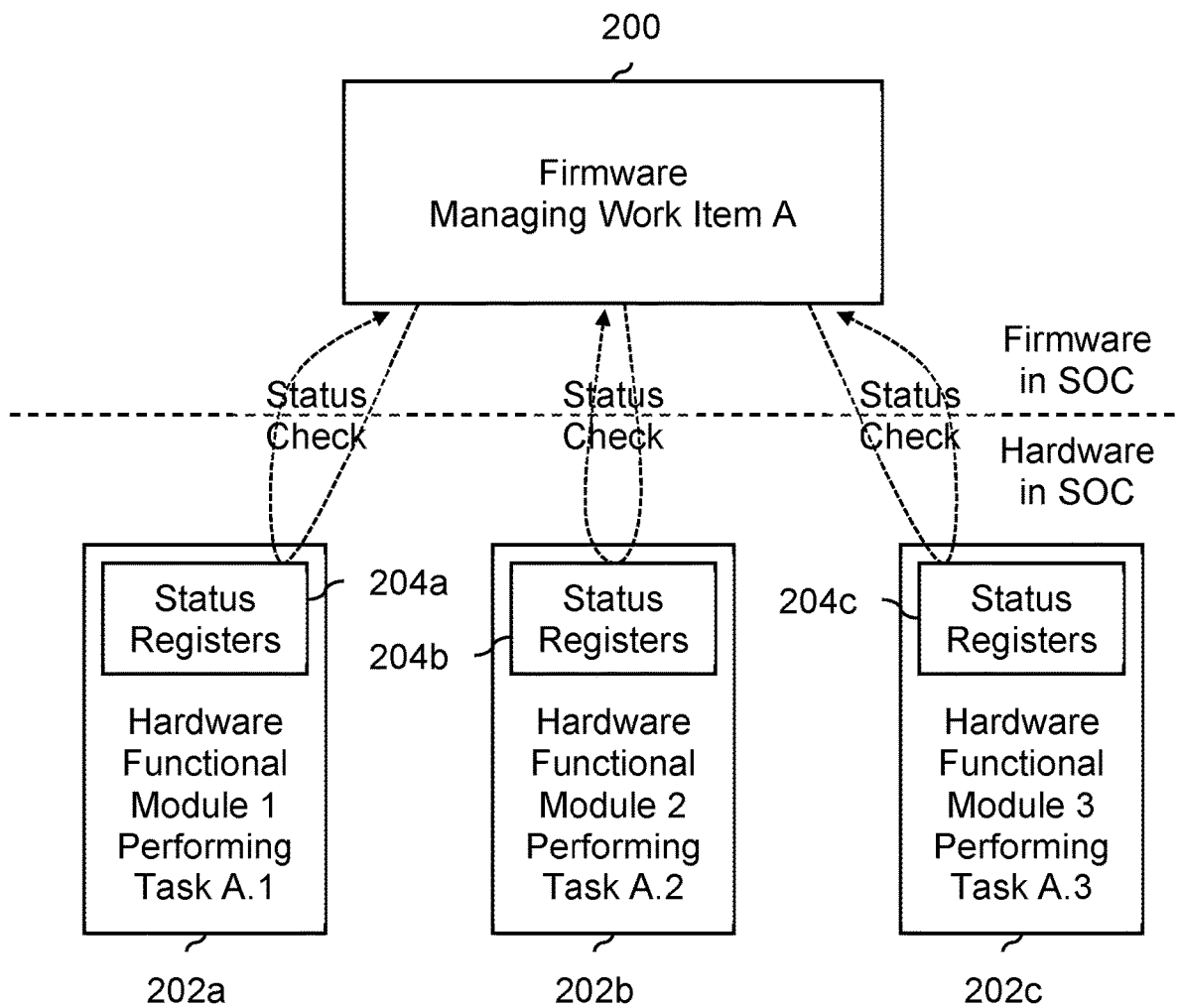
FIG. 2 is a block diagram illustrating an example of some other technique where tasks are tracked by firmware without the use of a scoreboard module.

FIG. 2 is a block diagram illustrating an example of some other technique where tasks are tracked by firmware without the use of a scoreboard module. In this example, firmware (200) is responsible for and/or managing a work item (i.e., Work Item A). The firmware is in the SOC, for example, running on a processor core in the SOC.

In this example, Work Item A has three tasks that are associated with and/or are components of the work item: Task A.1, Task A.2, and Task A.3. These tasks are performed (respectively) by a first hardware functional module (202a), a second hardware functional module (202b), and a third hardware functional module (202c).

In this example (where some other technique is shown), each of the hardware functional modules (202a-202c) has a status register (204a-204c), where the status and/or progress of the respective task (i.e., Task A.1, Task A.2, or Task A.3) is written or otherwise updated. To determine whether a particular task has completed, firmware (200) (e.g., periodically) reads and analyzes (i.e., performs a status check of) the status registers (204a-204c).

One downside to this approach is that it consumes firmware resources. As will be described in more detail below, some applications (e.g., a storage controller SOC) are especially impacted by this because they have work items with a relatively large degree of aggregation and/or parallelization; in such applications, the firmware will have more task completion tracking to do. This will require the SOC to use more powerful processor cores (i.e., to improve the performance of firmware running on the processor core) and/or may impede the performance of other operations (i.e., besides task completion tracking) by firmware.

Another downside to this approach is that the size of each status can be relatively large, thus requiring large amounts of data to be exchanged, analyzed, and/or stored. In one example, each status register (204a-204c) is 10 DWORDs long (where each DWORD is 32 bits) and a work item contains 16 tasks, so that firmware is reading and analyzing up to 160 DWORDs each time a status check across firmware and hardware is performed.

In contrast, the use of a scoreboard module to track completion of tasks eliminates (or at least mitigates) these issues. The following figure describes an example of this.

Figure 3:
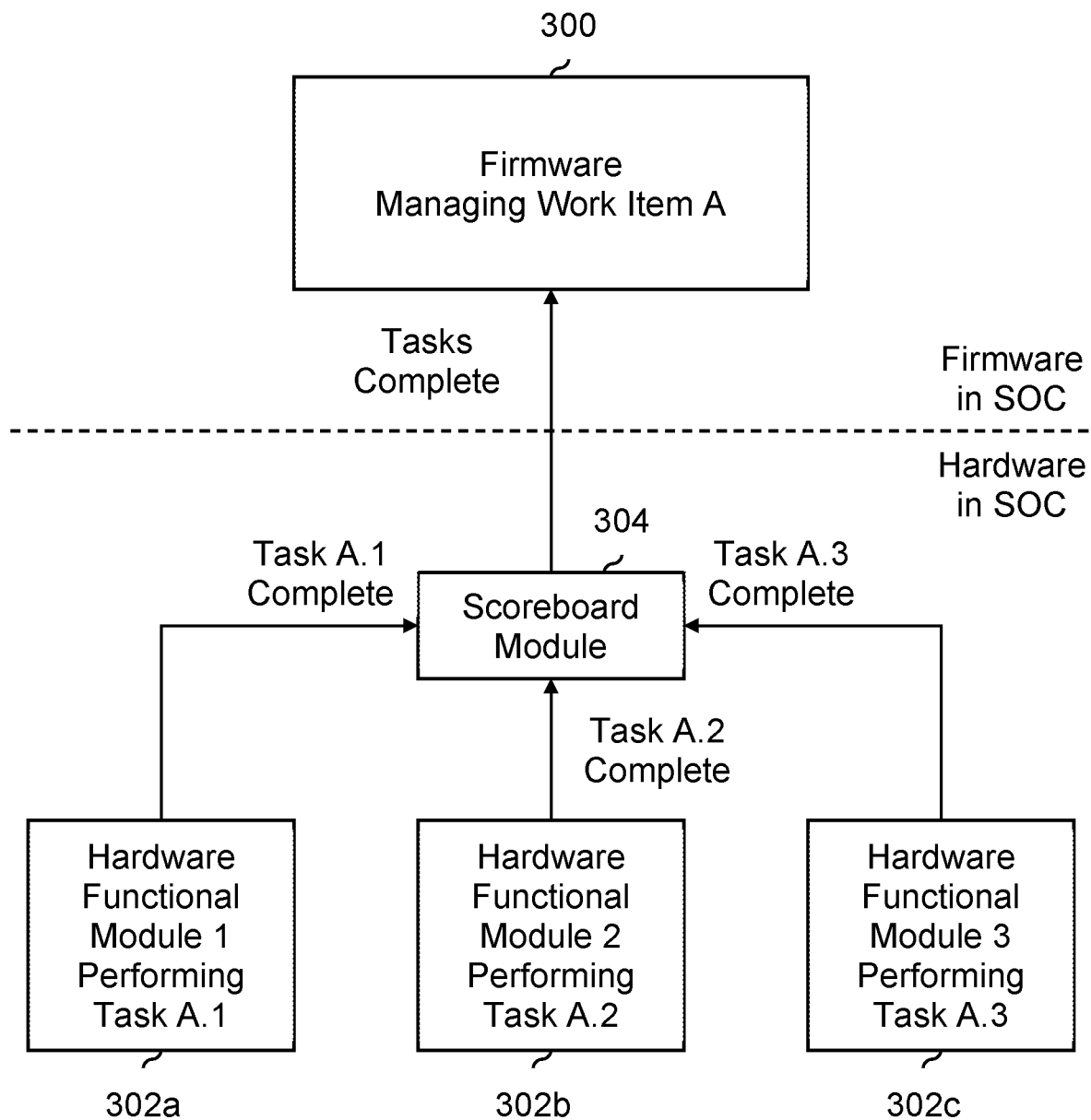
FIG. 3 is a block diagram illustrating an embodiment where a scoreboard module indicates to firmware when a plurality of tasks have completed.

FIG. 3 is a block diagram illustrating an embodiment where a scoreboard module indicates to firmware when a plurality of tasks have completed. As in the previous example, firmware (300) in an SOC is responsible for managing Work Item A and hardware functional modules (302a-302c) in the SOC are respectively performing related tasks A.1-A.3.

In contrast with the previous example, each of the hardware functional modules (302a-302c) communicates to the scoreboard module (304) when its respective task has completed. Once all of the tasks have completed (e.g., detected by incrementing a counter each time one of the tasks completes and comparing the counter to a threshold which is set to three), the scoreboard module (304) communicates to firmware (300) that the tasks have completed.

This arrangement offloads the (e.g., periodic) status checking from firmware (300) to the scoreboard module (304) which frees up firmware resources for other processing and/or permits less powerful processor cores (on which firmware (300) runs) to be used in the SOC. Moving the task completion checking from firmware to hardware may also enable faster overall processing (at least in some cases) because hardware tends to be faster than firmware and so total turnaround times may be reduced. The notification from the scoreboard module (304) to firmware (300) is also smaller than the status registers and/or information that would otherwise have to be exchanged (e.g., 1 DWORD for the completion of the 3 processes in the above example). Even if firmware (300) had to obtain status or state information (e.g., in order to determine next steps after the completion of Work Item A), it would be a single read, which would be much less information than the repeated (status) checking of multiple status registers.

The following figure shows an example block diagram of a scoreboard module that includes counters of different sizes and a command message that includes scoreboard settings and/or information.

Figure 4:
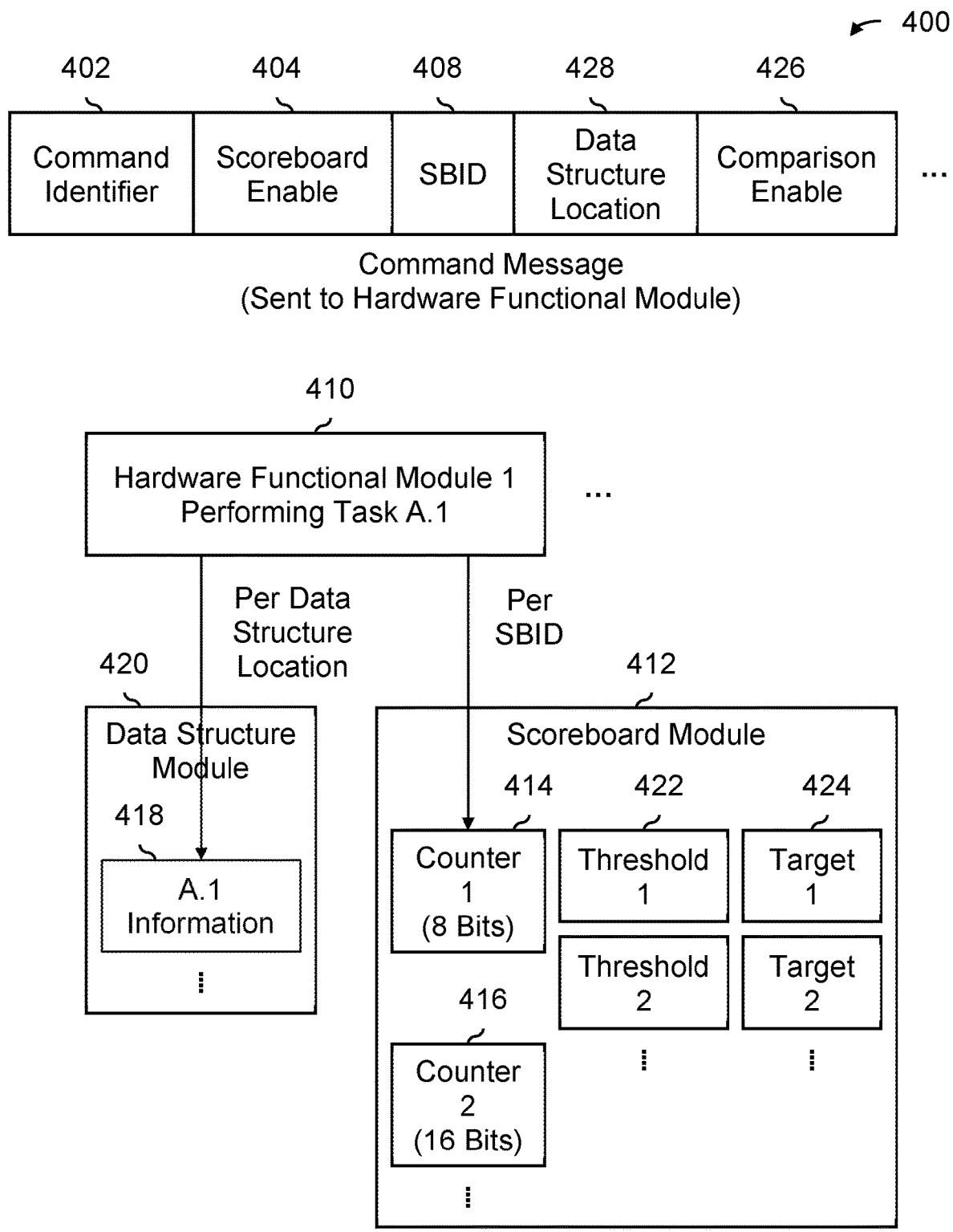
FIG. 4 is a diagram illustrating an embodiment of a scoreboard module that includes counters of different sizes and a command message that includes scoreboard settings and/or information.

FIG. 4 is a diagram illustrating an embodiment of a scoreboard module that includes counters of different sizes and a command message that includes scoreboard settings and/or information. In this example, tasks (e.g., Tasks A.1-A.3 in FIG. 3) are initiated by command messages (e.g., 400) that are sent to the hardware functional modules (e.g., 410). In response to receiving one of these command messages, the (e.g., target) hardware functional module begins the task specified by the command message. Diagram 400 shows an example command message format. For brevity, some fields which are not relevant to this example are not shown in diagram 400.

In this example, the first field in the command message (400) is a command identifier (402), which identifies the type of command message, which then in turn dictates the format of the rest of the message. The command identifier field (402) also specifies the type of task that is being initiated at the (e.g., target) hardware functional module. For example, suppose the hardware functional module is an LDPC decoder capable of performing error correction decoding in either a hard decoding mode or a soft decoding mode; one command identifier value would be for a "hard decode" command message and another command identifier value would be for a "soft decode" command message.

The scoreboard enable field (404) in the command message (400) is used to enable reporting to the scoreboard module once the hardware functional module has completed the task in question. For example, sometimes a storage controller SOC will perform a background scan to obtain the error rate of the attached NAND Flash storage. This background scan is not managed and/or overseen by firmware (e.g., another hardware functional module may be responsible) and therefore reporting from the scoreboard module to firmware is not necessary and/or of interest to firmware; correspondingly, the hardware functional module does not need to report task completion to the scoreboard module. Command messages that are directed to the LDPC decoder and that are associated with a background scan would therefore have their scoreboard enable field (404) set to DISABLE (i.e., is de-asserted). Another way to put this is that the decoding associated with the background scan does not complete any functional operation (e.g., from the point of view of firmware or the host in a storage controller SOC application), and thus scoreboard reporting is disabled.

In another example, scoreboard reporting is disabled using the scoreboard enable field (404) when the managing entity (i.e., that is managing the plurality of tasks associated with a work item) is a hardware functional module, as opposed to firmware. The scoreboard module (412) is designed to report back to firmware, not necessarily a hardware functional module. So, if one hardware functional module is managing a work item that includes a plurality of tasks and those tasks are performed by other hardware functional modules, the command messages that are exchanged between the (initiating) hardware functional modules and the (executing) hardware functional modules would have their scoreboard enable field (404) set to DISABLE.

In some embodiments, if the scoreboard enable bit (404) is set to DISABLE, the hardware functional module (410) will, upon the successful completion of Task A.1, indicate completion through some default technique, such as writing state or status information to a command and status register (CSR) in the hardware functional module (410) and/or in some local register in a processor core (e.g., upon which firmware runs), and not necessarily notify the scoreboard module.

In this example, the scoreboard module (412) includes multiple counters: a first counter (414) that has 8 bits and a second counter (416) that has 16 bits. The number of tasks in the group that includes Task A.1 (e.g., Tasks A.1-A.3) are able to be counted using the 8-bit first counter (414) and so that counter is assigned or otherwise allocated to that group. The use of both 8-bit counters and 16-bit counters in this example helps to optimize area (e.g., versus implementing only 16-bit counters). For example, most operations consist of less than 256 tracked completions, so an 8-bit counter is adequate. For simplicity, only two counter sizes are implemented but any number and/or combination of counter sizes may be used.

The SBID field (408) is used to provide a (e.g., globally relevant and/or globally usable) SBID to a hardware functional module (e.g., 410). In general, a SBID associates a given task (subtask) with the relevant counter in the scoreboard module related to that task (subtask). The global nature of the SBID included in the SBID field (408) provides an efficient method of communicating and managing task handoff between pipeline stages (e.g., because the SBID is meaningful and/or useful to all entities in the SOC).

In some embodiments, a target (e.g., firmware) needs to obtain some state or status information associated with Task A.1 to decide what steps or operations to perform next. To that end, the A.1 (state) information (418) is written to the data structure module (420) where it can be accessed later, as or if needed. The hardware functional module (410) uses the data structure location (428) provided in the command message (400) to write A.1 (state) information (418) to the specified location in the data structure module (420) once Task A.1 has completed. In one example, prior to the initiation of Task A.1, space for the state A.1 (state) information (418) is allocated in the data structure module (420) and that location is saved (e.g., for usage later) and/or populated into the data structure location field (428) in the command message (400). In some embodiments, the data structure location is a global value.

In some embodiments, the SBID and the location of related information in the data structure module are related, so that one can be computed from the other (and vice versa). For example, given a SBID value, the location of the state information is selected or otherwise determined by subtracting a fixed offset from the SBID value, multiplying the result by a fixed value (e.g., the size of the information in the data structure module), and then adding a fixed offset (e.g., the base address of the related information in the data structure module). In some other embodiments, the upper bits of the SBID value are used as an index into a lookup table, and the location of the related state information in the data structure module is calculated using the table result.

In some embodiments, the data structure module (420) is protected using an error detection code (EDC) and/or error correction code (ECC). For example, data structure module (420) may be implemented on SRAM protected with single error correction and double error detection (SECDED) coding.

The SBID (e.g., that is provided to the hardware functional module (410) via the SBID field (408) in the command message (400)) permits the proper counter to be updated when the hardware functional module (410) indicates to the scoreboard module (412) that a given task (e.g., Task A.1) is complete. In this example, based on the provided SBID, the scoreboard module (412) determines that the corresponding counter for that SBID is the first 8-bit counter (414) and that counter is incremented by the scoreboard module (412).

In some cases, the hardware functional module (410) encounters some error and/or exception while performing a task (e.g., Task A.1). In some embodiments, if there is an error, the hardware functional module (410) does not update or otherwise notify the scoreboard module (412). To put it another way, the scoreboard module (412) only tracks good path completions. In some other embodiments, if there is an error, the hardware functional module (410) notifies the scoreboard module (412) and sets a flag bit indicating that the sequence completed with an exception and/or error. In some embodiments, the error handling mode may be configured using a field (not shown) in the command message (400).

In this example, the first counter (414) is compared against the first threshold (422) (i.e., the corresponding threshold) to determine if the threshold has been exceeded. The first threshold (422) is a programmable value and is set to the number of tasks (subtasks) that the scoreboard module (412) is tracking for a particular work item (task). For FIG. 3, for example, the threshold would be set to three since there are three tasks (i.e., Tasks A.1-A.3) being tracked. In various embodiments, a comparison of a counter (e.g., 414) and its corresponding threshold (e.g., 422) is performed in a variety of ways such as: in response to a counter being incremented, in response to a communication or instruction from firmware (or, more generally, the target), periodically, etc.

If the first counter (414) exceeds the first threshold (422) then the target entity specified by the first target (424) is notified. In various embodiments, the target may be firmware in the SOC, a hardware functional module in the SOC, etc. As with the first threshold (422), the first target (424) is a programmable value and both may be set or otherwise programmed when a scoreboard module begins tracking a collection of tasks (subtasks). In some embodiments, the programmable target (e.g., 424) is used to control or specify the manner via which the target (e.g., firmware) is notified. Some examples of this are described in more detail below.

In some embodiments, the scoreboard module (412) is capable of reporting to and/or communicating with the target (e.g., firmware) in a variety of ways (e.g., faster but more disruptive vs. slower but less disruptive). In some embodiments, the target information (e.g., 424) includes a reporting mode or setting that controls how the scoreboard module (412) notifies the target (e.g., firmware). Some reporting examples are described in more detail below.

In some embodiments, firmware (or some other entity) is able to update or write to a counter (e.g., 414) and/or a threshold (e.g., 422) to "poke" or otherwise manually trigger a re-comparison of the counter and corresponding threshold by the scoreboard module (412). For example, firmware could direct a "plus 0" update or write instruction to either the first counter (414) and/or the first threshold (422) which would keep those values the same but trigger a comparison. In some embodiments, such a "poke" or re-comparison would also trigger a re-send of the completion message (e.g., even if the threshold was previously reached and even if a notification was previously sent to the target).

Once firmware has been notified and firmware is done with the A.1 (state) information (418), the scoreboard resources (e.g., the state information (418), the counter (414), the threshold (422), the target (424), etc.) may be reset and used for some other target and/or group of tasks (sub-tasks).

As described above, in some embodiments, the (e.g., first) counter (e.g., 414) has a first size (e.g., 8 bits); the (e.g., first) counter is one of a plurality of counters in the SOC; and the plurality of counters includes a second counter having a second size (e.g., 16 bits).

As described above, in some embodiments, the hardware functional module (e.g., 410) is configured to perform a given task (e.g., Task A.1) in response to receiving a command message (e.g., 400) that includes a SBID (e.g., 408) that is associated with a counter (e.g., 414); and the scoreboard module is further configured to select the counter from a plurality of counters based at least in part on the SBID.

As described above, in some embodiments, the hardware functional module (e.g., 410) is configured to perform a given task (e.g., Task A.1) in response to receiving a command message (e.g., 400) that includes a SBID (e.g., 408) that is associated with a location (e.g., 418) in a data structure (e.g., 420); the hardware functional module is further configured to write state information associated with the given task to the location associated with the SBID; and the firmware is further configured to: access the state information at the location using the SBID; and determine a next step based at least in part on the state information.

As described above, in some embodiments, the firmware is further configured to increment by zero (e.g., to trigger a comparison without changing any of the compared values) one or more of the following: the counter (e.g., 414) or the threshold (e.g., 422); and the scoreboard module (e.g., 412) is further configured to: determine whether the counter exceeds the threshold in response to any change to the counter, including incrementing the counter by zero; and determine whether the counter exceeds the threshold in response to any change to the threshold, including incrementing the threshold by zero.

In various embodiments, tasks and/or sub-tasks have a variety of required sequencing, relationships, and/or dependencies with each other. The following figure shows one such example and how it may be handled in some embodiments.

Figure 5:
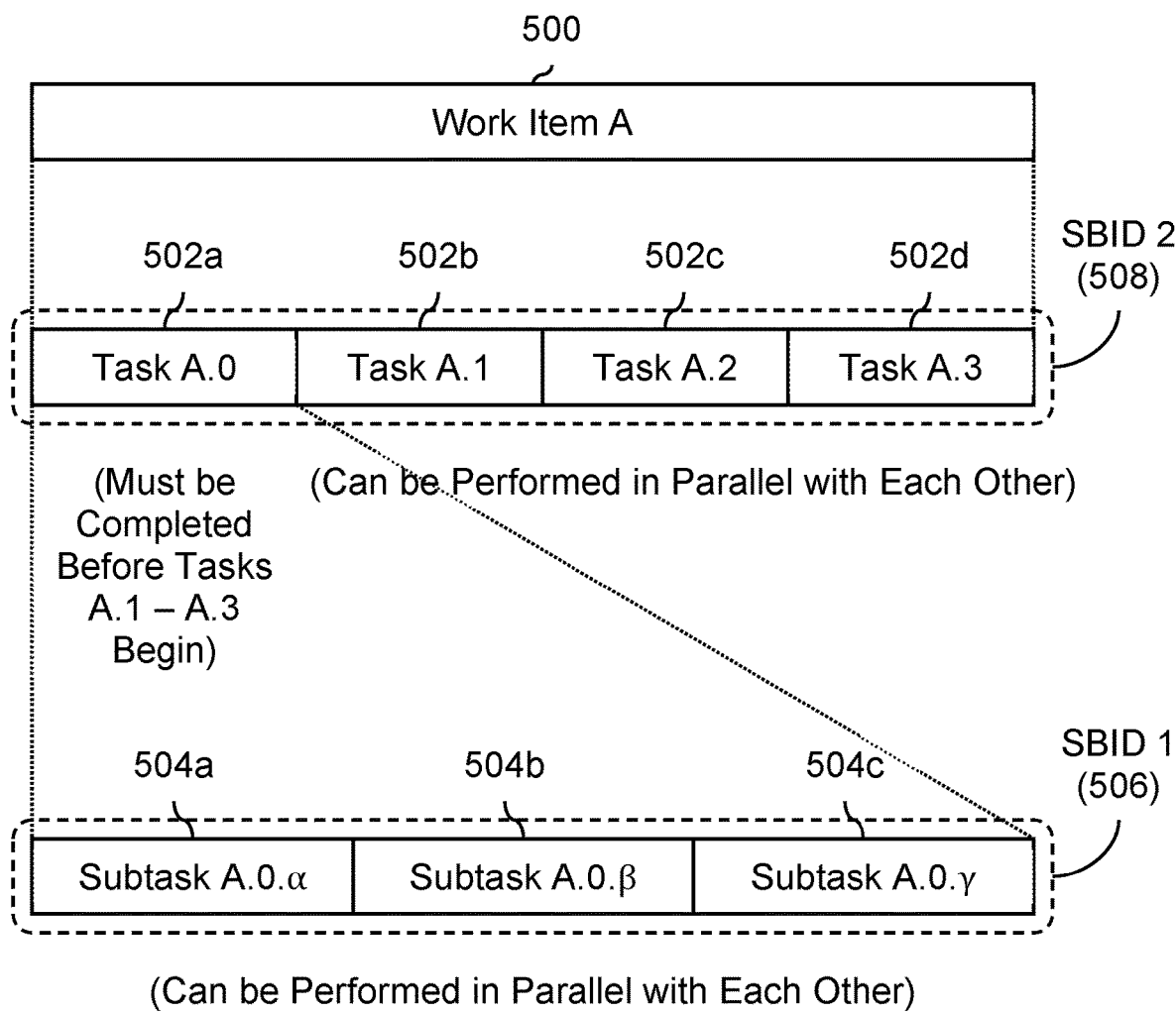
FIG. 5 is a diagram illustrating an embodiment of tasks with a sequence constraint where one of the tasks includes subtasks.

FIG. 5 is a diagram illustrating an embodiment of tasks with a sequence constraint where one of the tasks includes subtasks. In this example, firmware (not shown) is responsible for and/or manages Work Item A (500). Work Item A (500) includes or otherwise comprises Tasks A.0-A.3 (502a-502d) which are managed and/or performed by various hardware functional modules (not shown).

In this example, the tasks (502a-502d) have a sequence constraint; more specifically, Task A.0 (502a) must be performed before Tasks A.1-A.3 (502b-502d) can be performed. Once Task A.0 (502a) has completed, Tasks A.1-A.3 (502b-502d) can be performed (e.g., in parallel with each other if desired).

Task A.0 (502a), in turn, includes Subtasks A.0.α-A.0.γ (504a-504c) which are performed by various hardware functional modules (not shown). In this example, Subtasks A.0.α-A.0.γ (504a-504c) can be performed in parallel with each other.

In this example, the entity that is responsible for a given task or subtask is also responsible for ensuring that any sequence constraints (e.g., Task A.0 (502a) must be performed before Tasks A.1-A.3 (502b-502d)) are obeyed.

As such, to complete Work Item A (500), firmware first issues a command message (e.g., 400 in FIG. 4) to the appropriate hardware functional module (for convenience, referred to subsequently as HFM A.0) to perform Task A.0 (502a). The firmware also sets (e.g., in the scoreboard module) the appropriate threshold (e.g., 422 in FIG. 4) with a value of one and programs the target information (e.g., 424 in FIG. 4) so that the firmware is the target that the scoreboard module reports back to once the (single) Task A.0 (502a) has completed.

To complete Task A.0 (502a), HFM A.0 (not shown) initiates Subtasks A.0.α-A.0.γ (504a-504c), either locally (e.g., if HFM A.0 is also the hardware functional module that executes a particular subtask) or at some other hardware functional module. For simplicity, assume that Subtasks A.0.α-A.0.γ (504a-504c) are performed respectively by hardware functional modules HFMs A.0.α-A.0.γ (not shown), which are different from HFM A.0. HFM A.0 causes Subtasks A.0.α-A.0.γ (504a-504c) to be performed, for example, by sending command messages to HFMs A.0.α-A.0.γ, and by programming (e.g., in the scoreboard module) the appropriate threshold (e.g., with a value of three) and target information so that the scoreboard module notifies HFM A.0 when Subtasks A.0.α-A.0.γ (504a-504c) have completed. In this example, a first SBID (i.e., SBID 1) (506) is used to associate Subtasks A.0.α-A.0.γ (504a-504c) with a corresponding counter (not shown).

Once HFM A.0 has been notified by the scoreboard module that Subtasks A.0.α-A.0.γ (504a-504c) have completed, firmware is notified that Task A.0 (502a) has completed. In some embodiments, firmware is notified about the completion of Task A.0 (502a) via the scoreboard module.

Firmware is then able to initiate Tasks A.1-A.3 (502b-502d) in parallel, for example by sending command messages to hardware functional modules HFMs A.1-A.3 (not shown). Firmware may also program (e.g., in the scoreboard module) the appropriate threshold (e.g., with a value of three) and target information so that the scoreboard module notifies firmware when Tasks A.1-A.3 (502b-502d) have completed (e.g., in any order). In this example, a second SBID (i.e., SBID 2) (508) is used to associate Tasks A.0-A.3 (502a-502d) with a corresponding counter (not shown).

It is noted that there is no meaningful difference between Work Item A (500) and Task A.0 (502a), and likewise there is no meaningful difference between Tasks A.0-A.3 (502a-502d) and Subtasks A.0.α-A.0.γ (504a-504c), so the examples described above which have a work item and associated tasks may be replaced with a task and associated subtasks. For example, the work item referred to in FIG. 1 may comprise Task A.0 (502a) and the plurality of tasks referred to in FIG. 1 may comprise Subtasks A.0.α-A.0.γ (504a-504c).

As described above, a scoreboard module may inform the target (e.g., firmware or a hardware functional module) through a variety of communication channels and/or techniques that the tasks have completed. The following figures describe some such examples.

Figure 6:
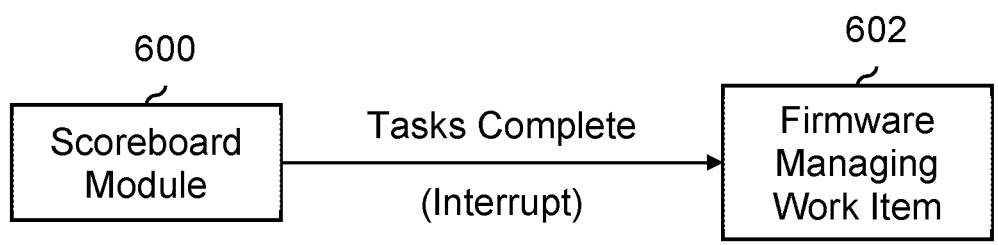
FIG. 6 is a diagram illustrating an embodiment in which a scoreboard module uses an interrupt to notify firmware that a plurality of tasks has completed.

FIG. 6 is a diagram illustrating an embodiment in which a scoreboard module uses an interrupt to notify firmware that a plurality of tasks has completed. In this example, the scoreboard module (600) notifies firmware (602) that the tasks (e.g., that are comprised of a work item being managed by the firmware) have completed via an interrupt.

In some applications, an interrupt is undesirable (e.g., because an interrupt triggers a context switch and the associated cost of the context switch is undesirable). In such applications, one of the following non-interrupt communication techniques may be desirable.

Figure 7:
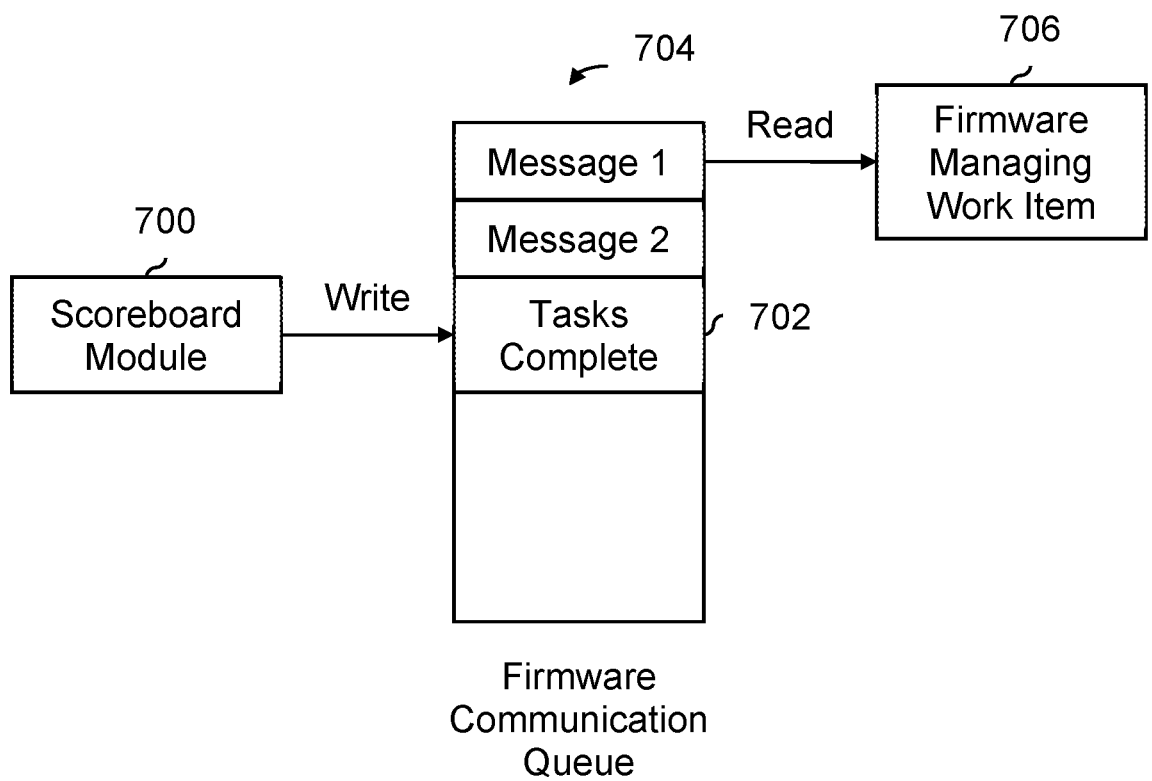
FIG. 7 is a diagram illustrating an embodiment in which a scoreboard module notifies firmware that a plurality of tasks has completed using a firmware communication queue.

FIG. 7 is a diagram illustrating an embodiment in which a scoreboard module notifies firmware that a plurality of tasks has completed using a firmware communication queue. In this example, the scoreboard module (700) puts a communication indicating that the tasks have completed (702) at the end of a firmware communication queue (704). The firmware (706) reads messages (e.g., in first-in, first-out (FIFO) order) from the firmware communication queue when the firmware has available processing resources, thus avoiding context switching.

Returning briefly to FIG. 1, in some embodiments, step 110 (where a second notification indicating that a plurality of tasks has completed is sent from the scoreboard module to firmware) is performed using one or more of the techniques described above. In some embodiments, the manner in which notification is performed is included in the corresponding target information (e.g., 424 in FIG. 4). To put it another way, the target information may include a target entity that is notified (e.g., firmware, a hardware functional module, etc.) as well as a channel or manner via which the target entity is notified (e.g., FIGS. 6-8).

As described above, in some embodiments, the hardware functional module (e.g., 410 in FIG. 4) is further configured to perform the given task in response to receiving a command message (e.g., 400 in FIG. 4) that includes a SBID (e.g., 408 in FIG. 4) that is associated with target information (e.g., 424 in FIG. 4) in the scoreboard module (e.g., 412 in FIG. 4); and the scoreboard module is further configured to: access the target information using the SBID, wherein the target information includes an interrupt associated with the firmware; and send the second notification, including by sending the second notification to the firmware via the interrupt (see, e.g., FIG. 6).

As described above, in some embodiments, the hardware functional module (e.g., 410 in FIG. 4) is further configured to perform the given task in response to receiving a command message (e.g., 400 in FIG. 4) that includes a SBID (e.g., 408 in FIG. 4) that is associated with target information (e.g., 424 in FIG. 4) in the scoreboard module (e.g., 412 in FIG. 4); and the scoreboard module is further configured to: access the target information using the SBID, wherein the target information includes a firmware communication queue (e.g., 704 in FIG. 7); and send the second notification, including by sending the second notification to the firmware via the firmware communication queue (see, e.g., FIG. 7).

It may be helpful to describe examples of the scoreboard module used in a specific application. The following figures describe some examples where the scoreboard module is used in a NAND Flash storage controller that is used to access NAND Flash storage. First, an example is described where a comparison enable bit (e.g., cmp_en) is used to start tasks (subtasks) sooner (e.g., before the value of the threshold is known) without the risk of a premature notification. Then, an example is described where a hardware functional module has multiple SBIDs and/or sends multiple notifications to the scoreboard module for a single task (subtask).

Figure 8:
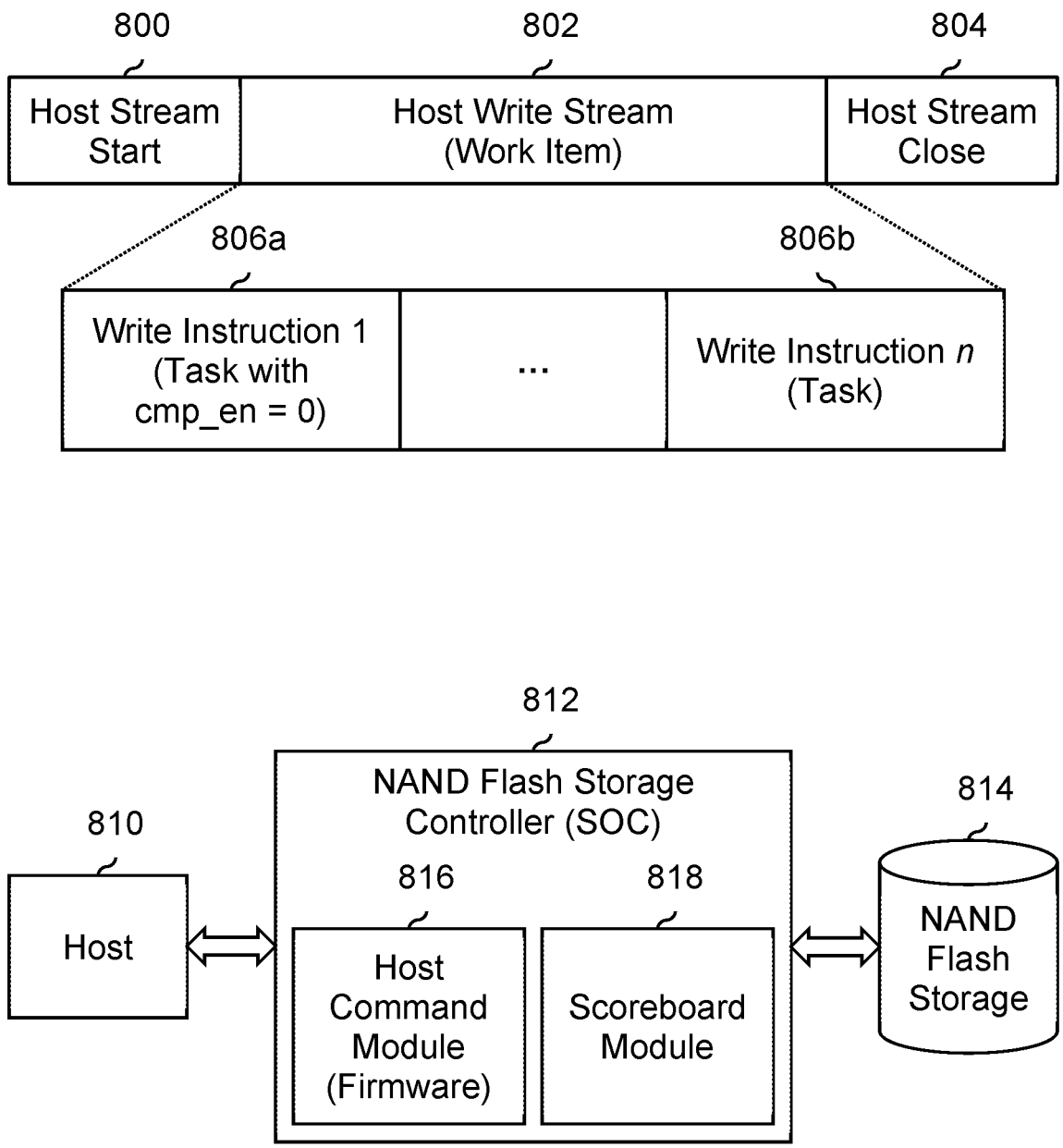
FIG. 8 is a diagram illustrating an embodiment of a NAND Flash storage controller that receives a host write stream.

FIG. 8 is a diagram illustrating an embodiment of a NAND Flash storage controller that receives a host write stream. In this example, a host (810) writes to and reads from NAND Flash storage (814) via a NAND Flash storage controller (812) which is implemented using an SOC.

The host (810) sends a host stream start communication (800) to the NAND Flash storage controller (812), indicating that a burst or stream of commands will follow. In this example, the host stream (802) includes (only) write commands, so the host stream is referred to as a host write stream. The host (810) is expecting the NAND Flash storage controller (812) to indicate to the host (810) when all of the write instructions (806a-806b) in the host write stream (802) have been (e.g., properly and without error) performed. More specifically, a host command module (816), which is implemented in firmware in this example, in the NAND Flash storage controller (812) is responsible for this notification. As such, the host command module (816) uses the scoreboard module (818) to track and notify the host command module (816) when all of the writes (806a-806b) have completed. In some embodiments, the host command module is implemented using and/or via NVM Express (NVMe).

When the first write instruction (806a) is received, the host stream close communication (804) has not yet been received at the NAND Flash Storage controller (812). As result of this, the value of the threshold (i.e., the number of write instructions (806a-806b) in the host write stream (802)) is not known. To initiate the first write instruction (806a) without knowing the (total) number of write instructions (tasks) and risking a premature notification by the scoreboard module, the first write instruction is initiated with the comparison enable flag (e.g., a bit) set to DISABLE (e.g., cmp_en=0).

In FIG. 1, for example, if the comparison enable bit is set to DISABLE, then the comparison of the counter and the threshold at 106 may be skipped so that a premature notification at 110 does not occur. It is noted that the hardware functional module (at least in this example) can still notify the scoreboard module that a given task has completed (e.g., step 102 in FIG. 1) even if the comparison enable bit is set to DISABLE. To put it another way, task (subtask) completions can accumulate at the scoreboard module, but the notification from the scoreboard module to the target (e.g., firmware) will not occur unless the comparison enable bit is set to ENABLE (i.e., is asserted).

Once the host stream close communication (804) is received at the NAND Flash storage controller (812) and the number (n) of write instructions (i.e., tasks) is known, the appropriate threshold can be set to n and the comparison enable bit can be set to ENABLE.

There are other scenarios where the comparison enable bit can be set to DISABLE to start a task (subtask) early. For example, in some cases, a dependent process or entity that consumes a notification may not yet have been created, allocated, established, or otherwise initialized. In some embodiments, tasks are initiated so that completions can be accumulated while waiting for a dependent process or entity to be ready; this may improve system performance and/or latency. To put it another way, the target may not necessarily be known, available, or allocated, and disabling the comparison enable bit permits a task (subtask) to start without having the target information readily available.

In various embodiments, the comparison enable bit is implemented in a variety of locations. In some embodiments, a command message (e.g., 400 in FIG. 4) includes a field (e.g., 426 in FIG. 4) for the comparison enable bit, and this value is passed to the hardware functional module, and then on to the scoreboard module. In some other embodiments, the scoreboard module includes a register for the comparison enable bit, such as part of or associated with the relevant threshold (e.g., 422 in FIG. 4) or relevant counter (e.g., 414 in FIG. 4).

As described in the examples above, in some embodiments, the hardware functional module is further configured to perform the given task in response to receiving a command message (e.g., 400 in FIG. 4) that includes a comparison enable (e.g., 426 in FIG. 4) that is set to a DISABLE value in the event a value for the threshold is unknown; and the scoreboard module is further configured to: in the event the comparison enable is set to an ENABLE value, determine whether the counter exceeds the threshold; and in the event the comparison enable is set to the DISABLE value, bypass the determination of whether the counter exceeds the threshold.

Figure 9:
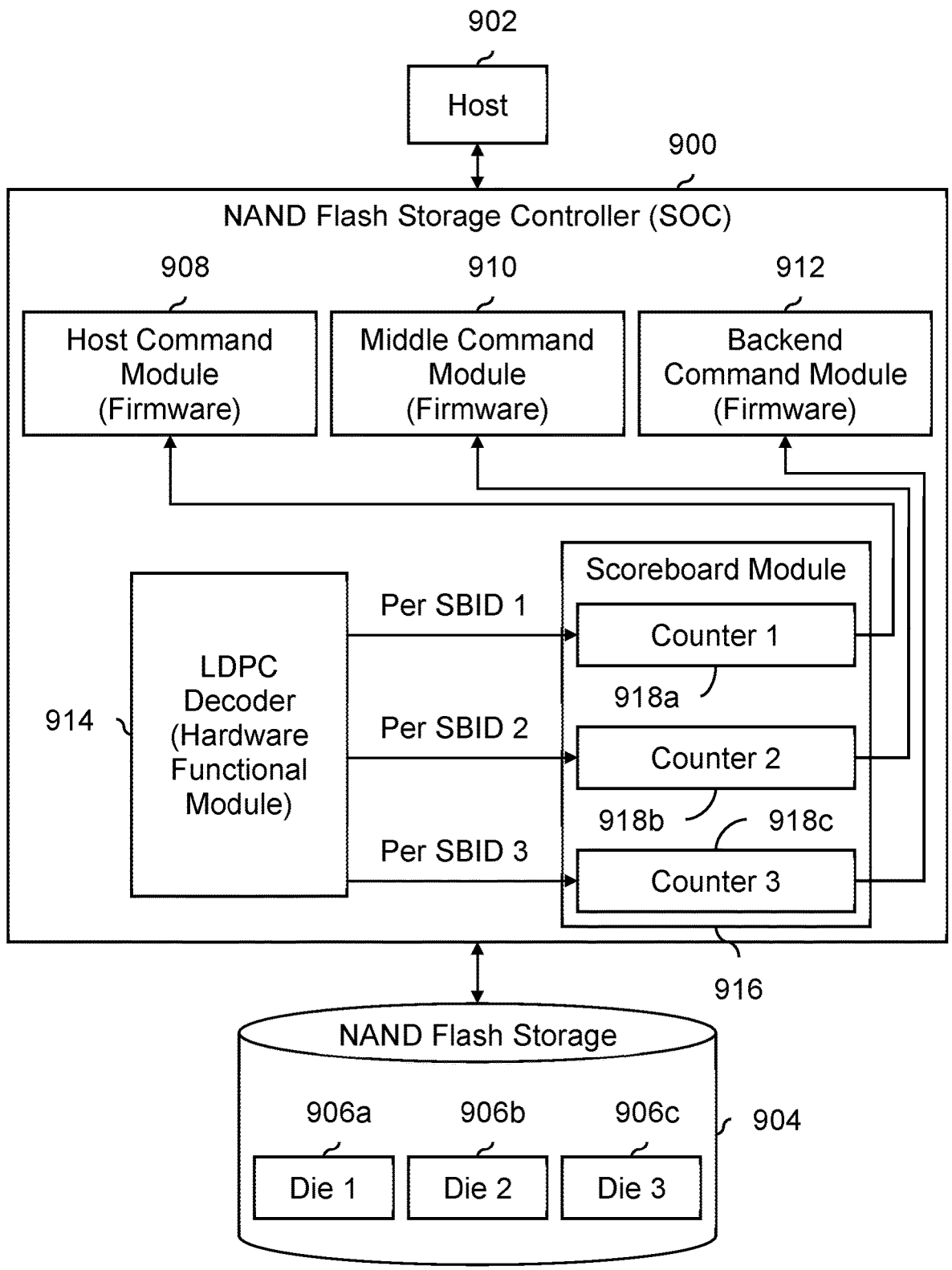
FIG. 9 is a diagram illustrating an embodiment of a NAND Flash storage controller with a host command module, middle command module, backend command module, and a low-density parity-check (LDPC) decoder.

FIG. 9 is a diagram illustrating an embodiment of a NAND Flash storage controller with a host command module, middle command module, backend command module, and a low-density parity-check (LDPC) decoder. As in the previous example, a NAND Flash storage controller (900), implemented on an SOC, sits between a host (902) and NAND Flash storage (904). In this example, the NAND Flash storage (904) includes three (NAND Flash storage) dies (906a-906c).

In this example, the NAND Flash storage controller (900) includes three control and/or command modules that are implemented in firmware: a host command module (908), a middle command module (910), and a backend command module (912). The host command module (908) is responsible for managing communications with the host (902). In FIG. 8, for example, the host command module is responsible for indicating to the host when all of the write instructions (806a-806b) in the host write stream (802) have been (e.g., successfully) completed.

Returning to FIG. 9, the middle command module (910) is responsible for operations internal to the NAND Flash storage controller (900) (e.g., decoupled from communication with the host (902) or NAND Flash storage (904)). For example, instructions from the host may refer to a logical address that is translated into a physical address; this is referred to as the flash translation layer (FTL); the middle command module (910) may perform or otherwise include FTL operations.

The backend command module (912) is responsible for communicating with the NAND Flash storage (904). In this example, the backend command module (912) breaks up and regroups tasks (subtasks) based on the die (906a-906c) that each task (subtask) is directed to. For example, suppose that Subtasks A.0.α-A.0.γ (504a-506c) are directed to dies (906a-906c), respectively, and are received together in a (e.g., logical) group by the backend command module (912). The backend command module (912) may divide up the sub-tasks and regroup them by die to generate a first set of subtasks directed to the first die (906a), a second set of subtasks directed to the second die (906b), and a third set of subtasks directed to the third die (906c). This may be more efficient and/or permit the use of faster communication techniques (e.g., streams or burst). In some embodiments, there are three independent communication channels (not shown) between the backend command module (912) and each respective die (906a-906c) where each set of subtasks is sent over the respective independent communication channel.

In this example, the NAND Flash storage controller (900) includes an LDPC decoder (914) which is implemented as a hardware functional module and is used to error correction decode the data that is stored on the NAND Flash storage (904). For example, data stored on the NAND Flash storage (904) may develop errors over time as the storage media degrades.

The three command modules (908, 910, and 912) have different (e.g., operational) responsibilities, domains, and/or granularities within the storage system and as such they may be interested in the completion of different collections of tasks (subtasks). Returning briefly to FIG. 5, as an example, the host command module (908) may need to inform the host (902) when Work Item A (500) has successfully completed. In contrast, the backend command module (912) may be more concerned with things at the lower levels (e.g., at the level of Subtasks A.0.α-A.0.γ (504a-506c)). As such, the host command module (908), the middle command module (910), and backend command module (912) may all want to know when a first, second, and third collection of tasks (subtasks) have completed, where all include the successful completion of the LDPC decoder. The first, second, and third collections of tasks (subtasks) are all different from each other because the various command modules (908, 910, and 912) are interested in and/or are responsible for different domains and/or granularities.

To enable the scoreboard module (916) to report these different completions to the command modules (908, 910, and 912), the LDPC decoder (914) provides the scoreboard module (916) with three SBIDs (i.e., SBID 1-SBID 3) when decoding has successfully completed. Returning briefly to FIG. 4, the exemplary command message (400) may be modified to have three scoreboard enable bits (404) and three SBID fields (408); this command message with three scoreboard enable bits and three SBID fields may be sent to the LDPC decoder (914). Returning to FIG. 9, three counters (918a-918c) in the scoreboard module (916) are assigned to the three SBIDs and three thresholds (not shown in FIG. 9) are configured with the appropriate threshold values. Three targets (e.g., 424 in FIG. 4) may be programmed to direct notification to the host command module (908), the middle command module (910), and the backend command module (912), respectively.

From top to bottom (i.e., from host (902) to NAND Flash storage (904)), the exemplary storage system shown here has a high degree of pipelining and/or parallelization. That is, at many points throughout the storage system, a work item (task) is broken upon into tasks (subtasks) which are performed independently or otherwise in parallel with each other and/or in pipeline stages. This high degree of pipelining and/or parallelization may make the use of a scoreboard module particularly attractive in storage controller applications because there are many collections of tasks (subtasks) that must be tracked and all of this tracking can be offloaded to the scoreboard module (e.g., instead of having firmware track and manage it).

As described above, in some embodiments, the hardware functional module (e.g., 914) is further configured to: perform the given task in response to receiving a command message (e.g., 400 in FIG. 4) that includes a first SBID and a second SBID; and send the first notification, including by sending the first SBID and the second SBID to the scoreboard module (see, e.g., FIG. 9); and the scoreboard module is further configured to: select the (first) counter and a second counter from a plurality of counters based at least in part on the first SBID and the second SBID, respectively; in response to receiving the first notification, increment the second counter; determine whether the second counter exceeds a second threshold; and in the event it is determined that the second counter exceeds the second threshold, send, from the scoreboard module to a target that is associated with the second SBID, a third notification indicating that a second plurality of tasks have completed (see, e.g., FIG. 5). In one example of the above embodiment, there are cascading scoreboard entities and in response to receiving the first notification, the (first) counter is incremented and if that (first) counter exceeds the first threshold (e.g., all of Subtasks A.0.α (504a)-A.0.γ (504c) in FIG. 5 have completed), a notification containing the second SBID is sent to itself (i.e., the scoreboard module); in response to this notification message, the second counter (e.g., associated with tracking Tasks A.0 (502a)-A.3 (502d) in FIG. 5) is incremented.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A System On Chip (SOC), comprising:
a hardware functional module that is configured to:
perform a given task, wherein the given task is one of a plurality of tasks that are associated with a work item and the work item is managed by firmware in the SOC; and
send, from the hardware functional module to a scoreboard module, a first notification that the given task has completed, wherein the scoreboard module is implemented in hardware on the SOC;
the scoreboard module, wherein the scoreboard module is configured to:
in response to receiving the first notification, increment a counter;
determine whether the counter exceeds a threshold; and
in the event it is determined that the counter exceeds the threshold, send, from the scoreboard module to the firmware, a second notification indicating that the plurality of tasks have completed; and
the firmware, wherein:
the counter has a first size;
the counter is one of a plurality of counters in the SOC; and
the plurality of counters includes a second counter having a second size.

2. The SOC recited in claim 1, wherein the hardware functional module is implemented on an application-specific integrated circuit (ASIC).

3. A System On Chip (SOC), comprising:
a hardware functional module that is configured to:
perform a given task, wherein the given task is one of a plurality of tasks that are associated with a work item and the work item is managed by firmware in the SOC; and
send, from the hardware functional module to a scoreboard module, a first notification that the given task has completed, wherein the scoreboard module is implemented in hardware on the SOC;
the scoreboard module, wherein the scoreboard module is configured to:
in response to receiving the first notification, increment a counter;
determine whether the counter exceeds a threshold; and
in the event it is determined that the counter exceeds the threshold, send, from the scoreboard module to the firmware, a second notification indicating that the plurality of tasks have completed; and
the firmware, wherein:
the hardware functional module is configured to perform the given task in response to receiving a command message that includes a scoreboard identifier (SBID) that is associated with the counter; and
the scoreboard module is further configured to select the counter from a plurality of counters based at least in part on the SBID.

4. A System On Chip (SOC), comprising:
a hardware functional module that is configured to:
perform a given task, wherein the given task is one of a plurality of tasks that are associated with a work item and the work item is managed by firmware in the SOC; and
send, from the hardware functional module to a scoreboard module, a first notification that the given task has completed, wherein the scoreboard module is implemented in hardware on the SOC;
the scoreboard module, wherein the scoreboard module is configured to:
in response to receiving the first notification, increment a counter;
determine whether the counter exceeds a threshold; and
in the event it is determined that the counter exceeds the threshold, send, from the scoreboard module to the firmware, a second notification indicating that the plurality of tasks have completed; and
the firmware, wherein:
the hardware functional module is configured to perform the given task in response to receiving a command message that includes a scoreboard identifier (SBID) that is associated with a location in a data structure;
the hardware functional module is further configured to write state information associated with the given task to the location associated with the SBID; and
the firmware is further configured to:
access the state information at the location using the SBID; and
determine a next step based at least in part on the state information.

5. A System On Chip (SOC), comprising:
a hardware functional module that is configured to:
perform a given task, wherein the given task is one of a plurality of tasks that are associated with a work item and the work item is managed by firmware in the SOC; and
send, from the hardware functional module to a scoreboard module, a first notification that the given task has completed, wherein the scoreboard module is implemented in hardware on the SOC;
the scoreboard module, wherein the scoreboard module is configured to:
in response to receiving the first notification, increment a counter;
determine whether the counter exceeds a threshold; and
in the event it is determined that the counter exceeds the threshold, send, from the scoreboard module to the firmware, a second notification indicating that the plurality of tasks have completed; and
the firmware, wherein:
the firmware is further configured to increment by zero one or more of the following: the counter or the threshold; and
the scoreboard module is further configured to:
determine whether the counter exceeds the threshold in response to any change to the counter, including incrementing the counter by zero; and
determine whether the counter exceeds the threshold in response to any change to the threshold, including incrementing the threshold by zero.

6. A System On Chip (SOC), comprising:
a hardware functional module that is configured to:
perform a given task, wherein the given task is one of a plurality of tasks that are associated with a work item and the work item is managed by firmware in the SOC; and send, from the hardware functional module to a scoreboard module, a first notification that the given task has completed, wherein the scoreboard module is implemented in hardware on the SOC;
the scoreboard module, wherein the scoreboard module is configured to:
in response to receiving the first notification, increment a counter;
determine whether the counter exceeds a threshold; and
in the event it is determined that the counter exceeds the threshold, send, from the scoreboard module to the firmware, a second notification indicating that the plurality of tasks have completed; and
the firmware, wherein:
the hardware functional module is further configured to perform the given task in response to receiving a command message that includes a scoreboard identifier (SBID) that is associated with target information in the scoreboard module; and
the scoreboard module is further configured to:
access the target information using the SBID, wherein the target information includes an interrupt associated with the firmware; and
send the second notification, including by sending the second notification to the firmware via the interrupt.

7. A System On Chip (SOC), comprising:
a hardware functional module that is configured to:
perform a given task, wherein the given task is one of a plurality of tasks that are associated with a work item and the work item is managed by firmware in the SOC; and
send, from the hardware functional module to a scoreboard module, a first notification that the given task has completed, wherein the scoreboard module is implemented in hardware on the SOC;
the scoreboard module, wherein the scoreboard module is configured to:
in response to receiving the first notification, increment a counter;
determine whether the counter exceeds a threshold; and
in the event it is determined that the counter exceeds the threshold, send, from the scoreboard module to the firmware, a second notification indicating that the plurality of tasks have completed; and
the firmware, wherein:
the hardware functional module is further configured to perform the given task in response to receiving a command message that includes a scoreboard identifier (SBID) that is associated with target information in the scoreboard module; and
the scoreboard module is further configured to:
access the target information using the SBID, wherein the target information includes a firmware communication queue; and
send the second notification, including by sending the second notification to the firmware via the firmware communication queue.

8. A System On Chip (SOC), comprising:
a hardware functional module that is configured to:
perform a given task, wherein the given task is one of a plurality of tasks that are associated with a work item and the work item is managed by firmware in the SOC; and
send, from the hardware functional module to a scoreboard module, a first notification that the given task has completed, wherein the scoreboard module is implemented in hardware on the SOC;
the scoreboard module, wherein the scoreboard module is configured to:
in response to receiving the first notification, increment a counter;
determine whether the counter exceeds a threshold; and
in the event it is determined that the counter exceeds the threshold, send, from the scoreboard module to the firmware, a second notification indicating that the plurality of tasks have completed; and
the firmware, wherein:
the hardware functional module is further configured to perform the given task in response to receiving a command message that includes a comparison enable that is set to a DISABLE value in the event a value for the threshold is unknown; and
the scoreboard module is further configured to:
in the event the comparison enable is set to an ENABLE value, determine whether the counter exceeds the threshold; and
in the event the comparison enable is set to the DISABLE value, bypass the determination of whether the counter exceeds the threshold.

9. A System On Chip (SOC), comprising:
a hardware functional module that is configured to:
perform a given task, wherein the given task is one of a plurality of tasks that are associated with a work item and the work item is managed by firmware in the SOC; and
send, from the hardware functional module to a scoreboard module, a first notification that the given task has completed, wherein the scoreboard module is implemented in hardware on the SOC;
the scoreboard module, wherein the scoreboard module is configured to:
in response to receiving the first notification, increment a counter;
determine whether the counter exceeds a threshold; and
in the event it is determined that the counter exceeds the threshold, send, from the scoreboard module to the firmware, a second notification indicating that the plurality of tasks have completed; and
the firmware, wherein:
the hardware functional module is further configured to:
perform the given task in response to receiving a command message that includes a first scoreboard identifier (SBID) and a second SBID; and
send the first notification, including by sending the first SBID and the second SBID to the scoreboard module; and
the scoreboard module is further configured to:
select the counter and a second counter from a plurality of counters based at least in part on the first SBID and the second SBID, respectively;
in response to receiving the first notification, increment the second counter;
determine whether the second counter exceeds a second threshold; and
in the event it is determined that the second counter exceeds the second threshold, send, from the scoreboard module to a target that is associated with the second SBID, a third notification indicating that a second plurality of tasks have completed.

10. A method, comprising:
using a hardware functional module in a System On Chip (SOC) to perform a given task, wherein the given task is one of a plurality of tasks that are associated with a work item and the work item is managed by firmware in the SOC;
sending, from the hardware functional module to a scoreboard module, a first notification that the given task has completed, wherein the scoreboard module is implemented in hardware on the SOC; and
using the scoreboard module to:
in response to receiving the first notification, increment a counter;
determine whether the counter exceeds a threshold; and
in the event it is determined that the counter exceeds the threshold, send, from the scoreboard module to the firmware, a second notification indicating that the plurality of tasks have completed, wherein:
the counter has a first size;
the counter is one of a plurality of counters in the SOC; and
the plurality of counters includes a second counter having a second size.

11. The method recited in claim 10, wherein the hardware functional module is implemented on an application-specific integrated circuit (ASIC).

12. A method, comprising:
using a hardware functional module in a System On Chip (SOC) to perform a given task, wherein the given task is one of a plurality of tasks that are associated with a work item and the work item is managed by firmware in the SOC;
sending, from the hardware functional module to a scoreboard module, a first notification that the given task has completed, wherein the scoreboard module is implemented in hardware on the SOC; and
using the scoreboard module to:
in response to receiving the first notification, increment a counter;
determine whether the counter exceeds a threshold; and
in the event it is determined that the counter exceeds the threshold, send, from the scoreboard module to the firmware, a second notification indicating that the plurality of tasks have completed, wherein:
the hardware functional module performs the given task in response to receiving a command message that includes a scoreboard identifier (SBID) that is associated with the counter; and
the method further includes using the scoreboard module to select the counter from a plurality of counters based at least in part on the SBID.

13. A method, comprising:
using a hardware functional module in a System On Chip (SOC) to perform a given task, wherein the given task is one of a plurality of tasks that are associated with a work item and the work item is managed by firmware in the SOC;
sending, from the hardware functional module to a scoreboard module, a first notification that the given task has completed, wherein the scoreboard module is implemented in hardware on the SOC; and
using the scoreboard module to:
in response to receiving the first notification, increment a counter;
determine whether the counter exceeds a threshold; and
in the event it is determined that the counter exceeds the threshold, send, from the scoreboard module to the firmware, a second notification indicating that the plurality of tasks have completed, wherein:
the hardware functional module performs the given task in response to receiving a command message that includes a scoreboard identifier (SBID) that is associated with a location in a data structure;
the method further includes using the hardware functional module to write state information associated with the given task to the location associated with the SBID; and
the method further includes using the firmware to:
access the state information at the location using the SBID; and
determine a next step based at least in part on the state information.

14. A method, comprising:
using a hardware functional module in a System On Chip (SOC) to perform a given task, wherein the given task is one of a plurality of tasks that are associated with a work item and the work item is managed by firmware in the SOC;
sending, from the hardware functional module to a scoreboard module, a first notification that the given task has completed, wherein the scoreboard module is implemented in hardware on the SOC; and
using the scoreboard module to:
in response to receiving the first notification, increment a counter;
determine whether the counter exceeds a threshold; and
in the event it is determined that the counter exceeds the threshold, send, from the scoreboard module to the firmware, a second notification indicating that the plurality of tasks have completed, wherein the method further includes:
using the firmware to increment by zero one or more of the following: the counter or the threshold; and
using the scoreboard module to:
determine whether the counter exceeds the threshold in response to any change to the counter, including incrementing the counter by zero; and
determine whether the counter exceeds the threshold in response to any change to the threshold, including incrementing the threshold by zero.

15. A method, comprising:
using a hardware functional module in a System On Chip (SOC) to perform a given task, wherein the given task is one of a plurality of tasks that are associated with a work item and the work item is managed by firmware in the SOC;
sending, from the hardware functional module to a scoreboard module, a first notification that the given task has completed, wherein the scoreboard module is implemented in hardware on the SOC; and
using the scoreboard module to:
in response to receiving the first notification, increment a counter;
determine whether the counter exceeds a threshold; and
in the event it is determined that the counter exceeds the threshold, send, from the scoreboard module to the firmware, a second notification indicating that the plurality of tasks have completed, wherein:
the hardware functional module performs the given task in response to receiving a command message that includes a scoreboard identifier (SBID) that is associated with target information in the scoreboard module; and the method further includes using the scoreboard module to:
   access the target information using the SBID, wherein the target information includes an interrupt associated with the firmware; and
   send the second notification, including by sending the second notification to the firmware via the interrupt.

16. A method, comprising:
using a hardware functional module in a System On Chip (SOC) to perform a given task, wherein the given task is one of a plurality of tasks that are associated with a work item and the work item is managed by firmware in the SOC;
sending, from the hardware functional module to a scoreboard module, a first notification that the given task has completed, wherein the scoreboard module is implemented in hardware on the SOC; and
using the scoreboard module to:
   in response to receiving the first notification, increment a counter;
   determine whether the counter exceeds a threshold; and
   in the event it is determined that the counter exceeds the threshold, send, from the scoreboard module to the firmware, a second notification indicating that the plurality of tasks have completed, wherein:
     the hardware functional module performs the given task in response to receiving a command message that includes a scoreboard identifier (SBID) that is associated with target information in the scoreboard module; and
     the method further includes using the scoreboard module to:
       access the target information using the SBID, wherein the target information includes a firmware communication queue; and
       send the second notification, including by sending the second notification to the firmware via the firmware communication queue.

17. A method, comprising:
using a hardware functional module in a System On Chip (SOC) to perform a given task, wherein the given task is one of a plurality of tasks that are associated with a work item and the work item is managed by firmware in the SOC;
sending, from the hardware functional module to a scoreboard module, a first notification that the given task has completed, wherein the scoreboard module is implemented in hardware on the SOC; and
using the scoreboard module to:
   in response to receiving the first notification, increment a counter;
   determine whether the counter exceeds a threshold; and
   in the event it is determined that the counter exceeds the threshold, send, from the scoreboard module to the firmware, a second notification indicating that the plurality of tasks have completed, wherein:
     the hardware functional module performs the given task in response to receiving a command message that includes a comparison enable that is set to a DISABLE value in the event a value for the threshold is unknown; and
     the method further includes using the scoreboard module to:
       in the event the comparison enable is set to an ENABLE value, determine whether the counter exceeds the threshold; and
       in the event the comparison enable is set to the DISABLE value, bypass the determination of whether the counter exceeds the threshold.

18. A method, comprising:
using a hardware functional module in a System On Chip (SOC) to perform a given task, wherein the given task is one of a plurality of tasks that are associated with a work item and the work item is managed by firmware in the SOC;
sending, from the hardware functional module to a scoreboard module, a first notification that the given task has completed, wherein the scoreboard module is implemented in hardware on the SOC; and
using the scoreboard module to:
   in response to receiving the first notification, increment a counter;
   determine whether the counter exceeds a threshold; and
   in the event it is determined that the counter exceeds the threshold, send, from the scoreboard module to the firmware, a second notification indicating that the plurality of tasks have completed, wherein the method further includes:
     using the hardware functional module to:
       perform the given task in response to receiving a command message that includes a first scoreboard identifier (SBID) and a second SBID; and
       send the first notification, including by sending the first SBID and the second SBID to the scoreboard module; and
     using the scoreboard module to:
       select the counter and a second counter from a plurality of counters based at least in part on the first SBID and the second SBID, respectively;
       in response to receiving the first notification, increment the second counter;
       determine whether the second counter exceeds a second threshold; and
       in the event it is determined that the second counter exceeds the second threshold, send, from the scoreboard module to a target that is associated with the second SBID, a third notification indicating that a second plurality of tasks have completed.

\* \* \* \* \*